(No Model.)
W. H. AMMONS.
PLOW.
No. 491,397.  Patented Feb. 7, 1893.
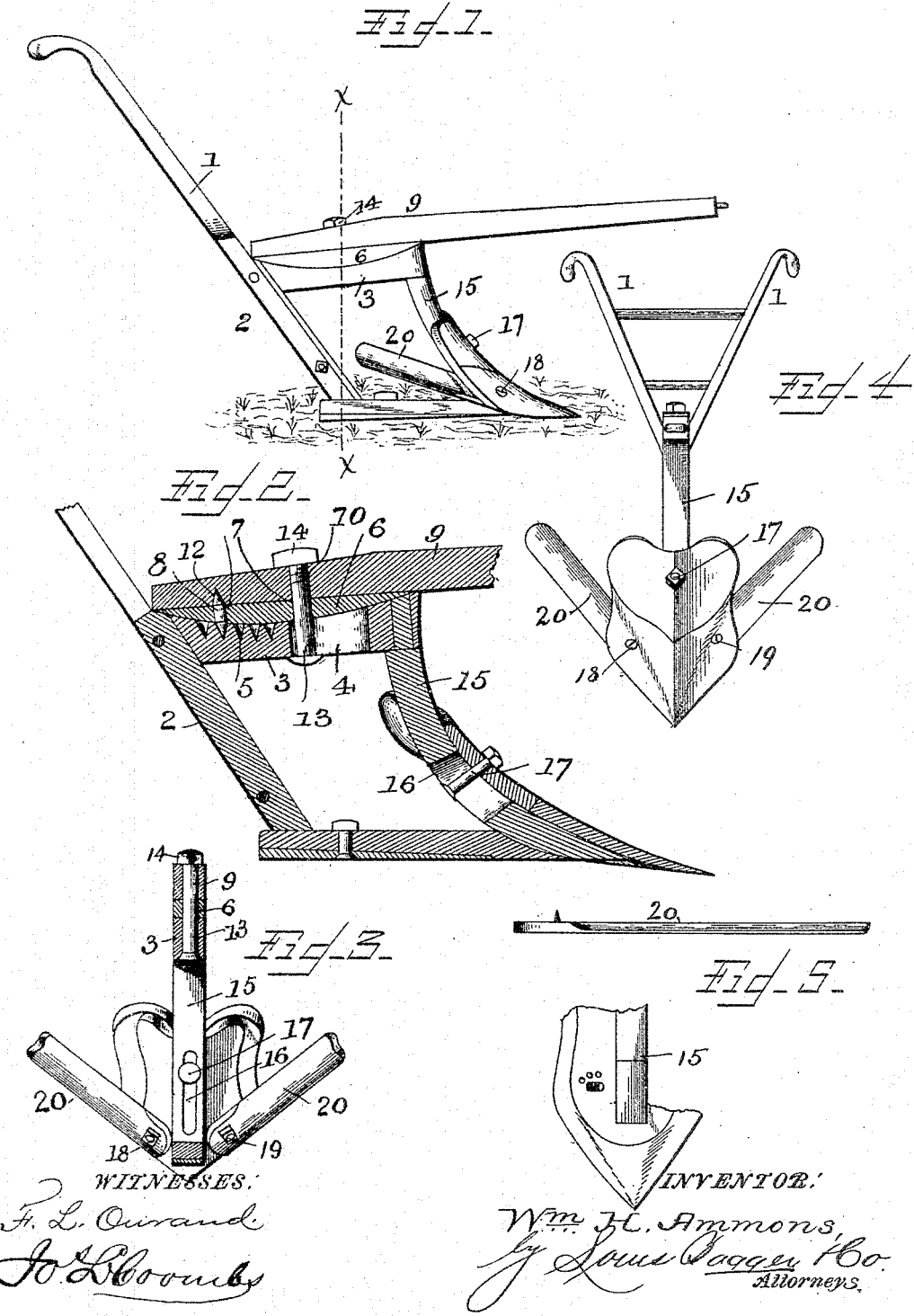
WITNESSES:
F. L. Ourand
J. L. Coombs
INVENTOR:
Wm. H. Ammons
by Louis Bagger & Co.
Attorneys.

UNITED STATES PATENT OFFICE.

WILLIAM HENRY AMMONS, OF LITTLE ROCK, SOUTH CAROLINA.

PLOW.

SPECIFICATION forming part of Letters Patent No. 491,397, dated February 7, 1893.

Application filed October 15, 1892. Serial No. 448,991. (No model.)

*To all whom it may concern:*

Be it known that I, WILLIAM HENRY AMMONS, a citizen of the United States, and a resident of Little Rock, in the county of Marion and State of South Carolina, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification.

My invention relates to improvements in plows, the object being to provide an improved construction which shall possess superior advantages with respect to simplicity and economy in construction and efficiency in operation.

In the accompanying drawings: Figure 1 is a side elevation of a plow constructed in accordance with my invention; Fig. 2 is a longitudinal section of the same; Fig. 3 is a cross section on the line x—x Fig. 1; Fig. 4 is a front view.

In the said drawings the reference numeral 1 denotes the handles secured to the rear upright of the standard 2. The upper edge of the horizontal bar or rail 3 of the standard is concaved from end to end and provided with an elongated slot 4 and a series of holes or apertures 5. Seated in this concavity is a horizontally movable or adjustable plate or bar 6, having its upper side plain or flat and its under side convex to correspond with the concavity in bar 3. This plate is provided with a hole 7, and with a pin or pins 8, projecting from the upper and lower sides thereof. Seated in this plate is the plow beam 9, provided with a hole 10, registering with the hole 7, and with a recess 12 to receive the upwardly projecting pin 8. Through the holes 7 and 10, and the slot 4, is a headed bolt 13, provided with a nut 14. The downwardly projecting pin 8, is adapted to engage with one of the holes 5, in the bar 3. The object of this construction is to adjust or regulate the height of the plow beam with which the draft animal is connected and the operation is as follows. When in the position shown in Fig. 1, the beam is in its lowest position with the plate 6 between the beam and the bar 3, and held securely in place by means of the bolt 13, and downwardly and upwardly projecting pins 8, which engages with one of the holes 5 in bar 3 and the hole 12 in the beam. To raise the beam or increase its height from the ground, the nut 14 is loosened and the pin withdrawn from the holes in the bar 3, and the plate and beam pushed forward so that the pin will engage with one of the preceding holes 5, as seen in Fig. 2. The nut is then tightened when the beam will be securely held in its adjusted position. From the above it will be seen that the height of the beam can be regulated in a simple, rapid, and efficient manner, a single bolt serving to securely hold the parts in any position to which they may be adjusted.

To the front lower end of the standard or sheth is secured the breast 15, provided with an elongated slot 16, through which passes a headed bolt 17, by which the mold-board or share is held in place. Secured to the breast at each side by means of headed screw bolts 18 and nuts 19, are adjustable wings 20, which may be moved outwardly at any angle desired, or removed altogether when necessary. By removing the share and breast any kind of shovel or sweep may be secured to the upright.

Having thus described my invention, what I claim is:

In a plow the combination with the upright having its upper edge concaved and formed with an elongated slot and a series of holes, of the convex plate having a central aperture and a downwardly projecting pin adapted to engage with the holes in the standard, the plow beam formed with an aperture, the headed bolt passing through said apertures and slot, and the nut engaging with said bolt, substantially as described.

In testimony that I claim the foregoing as my own I have hereunto affixed my signature in presence of two witnesses.

WILLIAM HENRY AMMONS.

Witnesses:
W. STACKHOUSE,
JOHN A. FORE.